Sept. 27, 1932.   M. PIRANI   1,879,472
GASEOUS ELECTRIC DISCHARGE DEVICE
Original Filed April 24, 1930

INVENTOR
Marcello Pirani
BY Charles E. Mullen
ATTORNEY

Patented Sept. 27, 1932

1,879,472

UNITED STATES PATENT OFFICE

MARCELLO PIRANI, OF BERLIN-WILMERSDORF, GERMANY, ASSIGNOR TO GENERAL ELECTRIC COMPANY, A CORPORATION OF NEW YORK

GASEOUS ELECTRIC DISCHARGE DEVICE

Application filed April 24, 1930, Serial No. 447,015, and in Germany May 27, 1929. Renewed January 23, 1932.

The present invention relates to gaseous electric discharge devices useful in the arts generally and particularly as electric lamps.

It is the object of this invention to provide an electric discharge guiding tube for gaseous electric discharge devices similar to those described in co-pending applications, Serial Number 387,057, filed August 19, 1929 being the invention of Marcello Pirani, Hans Ewest and Alfred Ruttenauer; Serial Number 407,525, filed November 15, 1929 and Serial Number 378,741, filed July 15, 1929 being the inventions of Marcello Pirani. In these applications the discharge guiding tube has a multiplicity of perforations or openings over its entire length; the guide tube of the present invention has but one opening in the form of a longitudinal slit running almost the full length of the guide tube. Such a guide tube makes possible the object of using even higher current densities in the discharge device than are practical in the devices disclosed in aforesaid co-pending applications, while the luminous or positive column of the discharge is still visible. A further object of the invention is to provide a guide tube which concentrates the light emitted by the gaseous discharge thus producing a greater light density. Further objects and advantages attaching to the device and to its use and operation will be apparent from the following particular description and from the claims.

Figure 1:
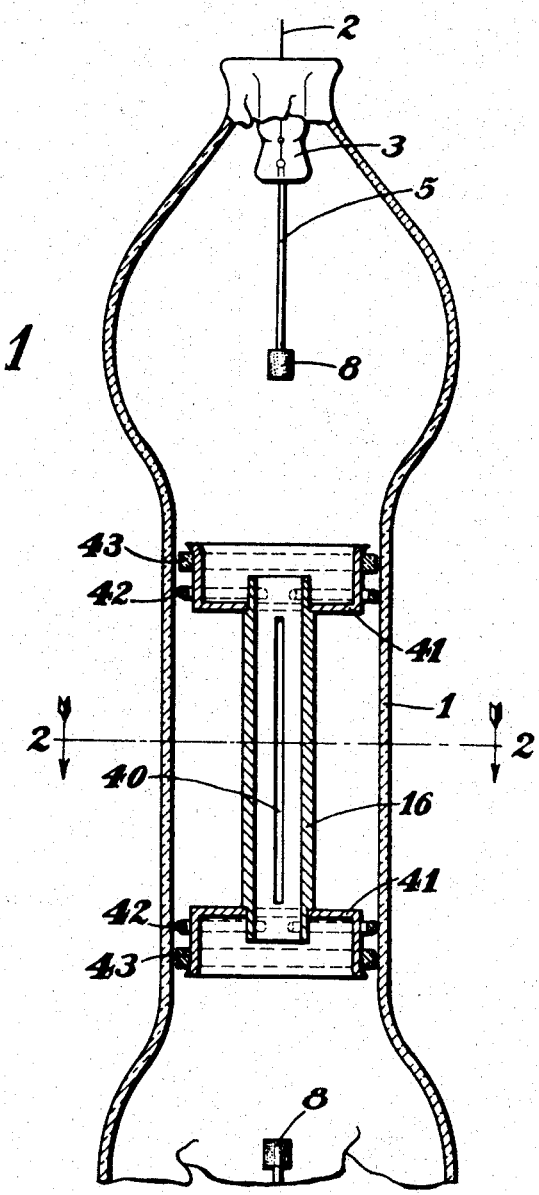

In the drawing accompanying and forming part of this specification an embodiment of the invention is shown for purposes of illustration in which, Fig. 1 is an elevational view of the discharge device shown partly in section with the new and novel discharge guiding tube and auxiliary apparatus shown wholly in section.

Figure 2:
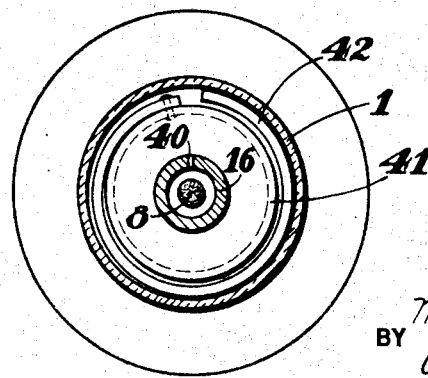

Fig. 2 is a cross-section of the device shown in Fig. 1 along the line 2—2 of Fig. 1.

Like numbers denote like parts in both views of the device.

Container 1 may be made of ordinary glass or a glass permeable to ultra-violet radiations. At each end of the container 1 are fused stems 3 having current leads 2 sealed therein. Electrode body 8, made of electron emitting material such as tungsten or sintered oxides, is attached to support 5 connected to lead 3 as shown. Said container 1 has a gaseous content of rare gases, common gases, vapors or mixtures of these. Tube 16 guides the gaseous discharge between electrodes 8, 8 and is made of a difficultly fusible material which is electrically conducting, such as tungsten or carbon. Slit 40 running the greater part of the length of guide tube 16 being only a narrow opening concentrates the light emitted by the gaseous discharge thus producing a greater light density. The discharge device can therefore be used for many purposes requiring a concentrated light source, for example, in connection with a spectrometer. As the gaseous discharge responds instantly to any change or fluctuation in the current or potential the discharge device can be used with great advantage as a signal device or as a light source for beacons. Said guide tube 16 is axially mounted between two cases 41 made of difficultly fusible metal such as tungsten or molybdenum. Between the outer cylindrical walls of said cases 41 and the inner cylindrical walls of container 1 are located spring rings 42 and ring 43 made of insulation material such as porcelain. Said spring rings 42 are attached to said cases 41 and press against the walls of container 1 as shown in Fig. 2 to support and maintain said cases 41 and guide tube 16 in position. Said porcelain rings 43 are attached to cases 41 and closely approach the walls of container 1 to prevent the discharge going between the walls of cases 41 and container 1.

While I have shown, described and have pointed out in the annexed claims certain new and novel features of the device and its use and operation it will be understood that various substitutions, modifications and changes in the form and details of the device may be made by those skilled in the art without departing from the broad spirit and scope of the invention. For example, cases 41 may be made of insulation material in which case special rings 43 can be omitted, or the guide tube can be attached to any of the electrode chambers shown in co-pending application or to disk shape supporting bodies and the tube can be operated to produce varying types of discharges, such as a positive column glow or a positive column arc discharge as will be apparent to those skilled in the art, to meet the needs of a particular service of the tube.

What I claim as new and desire to secure by Letters Patent of the United States, is:

1. In an electric discharge device a container, electrodes sealed therein, a gaseous filling therein, and a tubular body of conducting material surrounding the discharge path between said electrodes, said tubular body having a longitudinal opening therein.

2. In an electric discharge device a container, electrodes sealed therein, a gaseous filling therein, and a tubular body of conducting material surrounding the discharge path between said electrodes, said tubular body having a longitudinal opening therein, and supporting members for said tubular body dividing the discharge device into sections.

3. In an electric discharge device, a container, electrodes sealed therein, a gaseous filling therein, a tubular body of conducting material surrounding the discharge path between said electrodes, said tubular body having a longitudinal opening thereon, and extension bodies mounted on the ends of and supporting said tubular body.

4. In an electric discharge device a container, electrodes sealed therein, a gaseous filling therein, a tubular body of conducting material surrounding the discharge path between said electrodes, said tubular body having a longitudinal opening therein, and cylindrical bodies having a spring ring pressing against the walls of the container adapted to support said cylindrical bodies, and a ring of insulation material between the outer walls of the cylindrical bodies and the inner cylindrical walls of said container, said cylindrical bodies attached to opposite ends of the tubular body and supporting same.

In witness whereof I have hereunto set my hand this 10th day of April 1930.

MARCELLO PIRANI.

CERTIFICATE OF CORRECTION.

Patent No. 1,879,472. September 27, 1932.

MARCELLO PIRANI.

It is hereby certified that error appears in the printed specification of the above numbered patent requiring correction as follows: Page 2, line 29, claim 3, for "thereon" read "therein"; and that the said Letters Patent should be read with this correction therein that the same may conform to the record of the case in the Patent Office.

Signed and sealed this 28th day of March, A. D. 1933.

(Seal)

M. J. Moore,
Acting Commissioner of Patents.